Patented Feb. 22, 1949

2,462,601

UNITED STATES PATENT OFFICE 2,462,601

TETRACHLOROPHTHALIC DIESTERS

George J. Bohrer, Troy, N. Y., assignor to General Electric Company, a corporation of New York No Drawing. Application January 15, 1946, Serial No. 641,412

3 Claims. (Cl. 260—475)

This invention is concerned with new and valuable chemical compounds and methods of preparing such compounds. Specifically it relates to tetrachlorophthalic diesters of an octyl alcohol.

The diesters of the present invention have various uses, for example as insecticides, as plasticizers and light-stabilizers for polyvinyl halide resins, etc. Compositions comprising a polyvinyl halide plasticized with a tetrachlorophthalic diester of an octyl alcohol are more specifically disclosed and claimed in my copending application Serial No. 641,411, filed concurrently herewith, and assigned to the same assignee as the present invention.

Unhalogenated phthalic acid diesters of an octyl alcohol, as for example di-(2-ethylhexyl) phthalate, have been used as plasticizers for polyvinyl chloride resins. However, these compounds have several disadvantages when used for such purposes in certain applications. Among these disadvantages are poor flame resistance and poor aging characteristics. Thus, although a polyvinyl chloride resin plasticized with di-(2-ethylhexyl) tetrachlorophthalate does not support combustion and is self-extinguishing, and loses only 4% of its elongation power when heat-aged at 250° F. for 5 days, the same polyvinyl chloride resin plasticized with an equivalent amount of di-(2-ethylhexyl) phthalate supports combustion and burns at the rate of 0.75 inch per minute, and loses 76% of its elongation power when heat-aged as above.

As pointed out in my aforesaid copending application, it was surprising to find that these new tetrachlorophthalic diesters could be utilized as plasticizers for polyvinyl chloride resins, since many high molecular weight, chlorinated compounds similar in structure to the claimed compounds exert little, if any, plasticizing effect on such resins. Thus, di-(n-decyl) tetrachlorophthalate is incompatible with polyvinyl chloride resin and no plasticizing effect on the resin is noted.

These new diesters are prepared by effecting reaction, in the presence of an esterification catalyst, between (1) a compound selected from the class consisting of tetrachlorophthalic acid and tetrachlorophthalic anhydride, and (2) an octyl alcohol. (By an octyl alcohol is meant one which contains only 8 carbon atoms.) The diesters are prepared, preferably, with an excess of the octyl alcohol, e. g., from 2 to 6 or 8 mols of the alcohol per mol of the acid or anhydride, and in the presence of a small amount of an esterification catalyst such as sulfuric acid, hydrochloric acid, benzene sulfonic acid, para-toluenesulfonic acid, etc.

The amount of catalyst employed in the esterification reaction may be varied at will. The usual amount will range from about 0.001 mol to 1 mol of catalyst per mol of tetrachlorophthalic acid or anhydride employed. Preferably I employ from 0.01 to 0.1 mol of the esterification catalyst per mol of the acid or anhydride.

A wide range of temperatures may be used in carrying out the reaction, but it is preferred to effect reaction at a temperature between about 150–215° C. I have found that good yields are obtained if the reaction is carried out at the reflux temperature of the reaction mass. Such temperatures usually range from about 185–210° C., depending, for example, on the type and amount of octyl alcohol used. The reaction may also be carried out at various pressures, e. g., at normal, superatmospheric or subatmospheric pressures. It is preferable that the reaction between the acid or anhydride and the octyl alcohol be effected at normal pressures since it is desirable to remove the water formed during the reaction as an azeotrope, distilling together with the alcohol. The time of reaction may vary from about 1 to 8 or 10 hours, or more, depending upon various conditions, e. g., temperature and pressure. I prefer to effect reaction for a time ranging from about 2 to 6 hours. Higher temperatures and pressures allow the reaction to be effected within a shorter period of time.

After the reaction is completed, the oily residue is washed with an aqueous basic material such as alkali-metal carbonates and bicarbonates, e. g., sodium carbonate, potassium carbonate, sodium bicarbonate, or alkali-metal hydroxides, e. g., sodium hydroxide, potassium hydroxide, etc., or the alkaline-earth metal carbonates, bicarbonates and hydroxides, e. g., barium hydroxide, calcium bicarbonate, etc. The washed material is then distilled under reduced pressure to obtain the desired product.

In the reaction mixture there are usually obtained various by-products including the tetrachlorophthalic mono ester of the octyl alcohol.

The following examples illustrate the manner in which this invention may be practiced but are not to be construed as limiting the invention thereto.

Example 1

572 grams (2.0 mols) tetrachlorophthalic anhydride and 676 grams (5.2 mols) 2-ethylhexanol were reacted in the presence of 10 grams (0.058 mol) para-toluene sulfonic acid as the esterification catalyst in a 3-necked flask employing a mechanical stirrer to agitate the reaction mass. The apparatus was set up in such a manner that the vapors produced were condensed and passed into a liquid-liquid separator whereby the upper layer (2-ethylhexanol) was able to return to the reaction flask. The reaction was effected at 195–205° C. for about 5 hours after which time about 50 ml. of water had been obtained. Thereafter a vacuum of about 26–27 inches of mercury was applied for 15 minutes while applying heat; 245 ml. of distillate (mostly 2-ethylhexanol) and 50 ml. water came over. The reaction mass was then cooled and the precipitated crystals were removed by filtration. The oily filtrate was washed with an aqueous 5% sodium carbonate solution at 65–70° C. and then with water at the same temperature. The low-boilers were removed by the application of heat and vacuum. Fuller's earth (5%) was stirred into the remaining liquid at 200° C. and then removed by filtration. The filtrate was dried and distilled to yield di-(2-ethylhexyl) tetrachlorophthalate which boiled at about 210° C. at 0.1 mm. pressure. The product had an acid number less than 2 and a viscosity of 165 centipoises at 25° C. The saponification number was 211.5 (calculated 212). The refractive index and density at 25° C. were 1.5130 and 1.179, respectively.

*Example 2*

Di-(n-octyl) tetrachlorophthalate is prepared in exactly the same manner as disclosed in Example 1 except that 676 grams (5.2 mols) n-octyl alcohol are employed in place of the 676 grams 2-ethylhexanol used in Example 1. Di-(n-octyl) tetrachlorophthalate boils at about 230° C. at 0.1 mm.

Other octyl alcohols may be used in place of the 2-ethylhexanol and n-octyl alcohol employed in the above examples. Among these are octanol-2, 2-methylheptanol-3, 1-methylheptanol, 4-methylheptanol, 3-ethylhexanol-2, butyl propyl carbinol, 2,3-dimethylhexanol-3, as well as the many other isomeric forms of octyl alcohol. When these alcohols are substituted in place of the 2-ethylhexanol in Example 1, other diesters within the scope of the claimed invention are formed. Among these novel diesters there may be mentioned di-(1-methylheptyl) tetrachlorophthalate, di-(4-methylheptyl) tetrachlorophthalate, di-(3-ethylhexyl) tetrachlorophthalate, as well as other tetrachlorophthalic diesters in which the alcohol employed is another isomer of octyl alcohol.

What I claim as new and desire to secure by Letters Patent of the United States is:

1. The method of preparing di-(2-ethylhexyl) tetrachlorophthalate which comprises (1) heating at a temperature of from 150 to 215° C. a mixture consisting of (a) 2-ethylhexanol, (b) a chlorinated compound selected from the class consisting of tetrachlorophthalic acid and tetrachlorophthalic anhydride, and (c) an esterification catalyst, the ingredients (a) and (b) being present in a molar ratio of from 2 to 8 mols of the former per mol of the latter, (2) continuing the heating of the mixture while at the same time continuously removing the forming water of esterification in the form of an azeotropic isolating the di-(2ethylhexyl) tetrachlorophthalate formed thereby.

2. The method as in claim 1 wherein the reaction temperature is from 185 to 210° C. and the ingredients (a) and (b) are present in the molar ratio of from 2 to 6 mols of the 2-ethylhexanol per mol of the chlorinated compound of (b).

3. The method of preparing di-(2-ethylhexyl) tetrachlorophthalate which comprises (1) heating at a temperature of from 150 to 250° C. a mixture consisting of (a) 2-ethylhexanol, (b) a chlorinated compound selected from the class consisting of tetrachlorophthalic acid and tetrachlorophthalic anhydride, and (c) para-toluene sulfonic acid, the ingredients (a) and (b) being present in a molar ratio of from 2.6 to 8 mols of the former per mol of the latter, (2) continuing the heating of the mixture while at the same time continuously removing the resulting water of esterification in the form of an azeotropic mixture with the excess 2-ethylhexanol, and (3) isolating the di-2(ethylhexyl) tetrachlorophthalate formed thereby.

GEORGE J. BOHRER.

REFERENCES CITED

The following references are of record in the file of this patent:

UNITED STATES PATENTS

| Number | Name | Date |
|---|---|---|
| 1,993,736 | Graves et al. | Mar. 12, 1935 |
| 2,062,403 | Dreyfus | Dec. 1, 1936 |
| 2,398,882 | Clark | Apr. 23, 1946 |

OTHER REFERENCES

Fieser et al., "Organic Chem." (1944), p. 592.
Graebe, "Annalen der Chem." (1887), pp. 318–328, vol. 237.
Rice et al., "J. A. C. S.," vol. 59 (1937), p. 2000.
Graebe et al., "Berichte der Chem. Gesell.," vol. 34 (1901).

Certificate of Correction

Patent No. 2,462,601. February 22, 1949.

GEORGE J. BOHRER

It is hereby certified that errors appear in the printed specification of the above numbered patent requiring correction as follows:

Column 4, line 14, claim 1, before the word "isolating" insert *mixture with the excess 2-ethylhexanol, and (3)*; same line, for "di-(2ethylhexyl)" read *di-(2-ethylhexyl)*; and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*